United States Patent
Chen et al.

(10) Patent No.: US 7,345,237 B2
(45) Date of Patent: Mar. 18, 2008

(54) MOUNTING APPARATUS FOR DATA STORAGE DEVICE

(75) Inventors: Yun-Lung Chen, Shenzhen (CN); Qing-Hao Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 233 days.

(21) Appl. No.: 11/308,057

(22) Filed: Mar. 4, 2006

(65) Prior Publication Data

US 2007/0205010 A1  Sep. 6, 2007

(51) Int. Cl.
*H02G 3/08* (2006.01)
*H05K 5/02* (2006.01)

(52) U.S. Cl. .................. 174/50; 174/520; 361/685; 361/683; 361/684

(58) Field of Classification Search .......... 174/50, 174/52.1, 17 R; 220/3.2, 4.02; 248/65, 248/73, 534, 535; 439/535; 361/600, 601, 361/683–686, 679, 807, 724–727, 747, 809; 312/222, 249, 223.1, 350, 223.2, 223.3
See application file for complete search history.

(56) References Cited

U.S. PATENT DOCUMENTS

| | | | |
|---|---|---|---|
| 6,359,836 B1 * | 3/2002 | Sevier et al. | 174/50 |
| 6,373,694 B1 | 4/2002 | Chang | |
| 6,377,449 B1 * | 4/2002 | Liao et al. | 361/685 |
| 6,388,873 B1 * | 5/2002 | Brooks et al. | 361/685 |
| 6,590,775 B2 * | 7/2003 | Chen | 361/685 |
| 6,628,514 B2 * | 9/2003 | Chen | 361/685 |
| 6,628,515 B2 * | 9/2003 | Chen et al. | 361/685 |
| 6,721,177 B1 * | 4/2004 | Wang et al. | 361/685 |
| 6,775,132 B2 * | 8/2004 | Chen et al. | 361/685 |
| 6,798,652 B2 * | 9/2004 | Wang et al. | 361/685 |
| 6,874,223 B2 * | 4/2005 | Reilley | 361/685 |
| 6,956,737 B2 * | 10/2005 | Chen et al. | 361/685 |
| 7,006,351 B2 * | 2/2006 | Chen et al. | 361/685 |
| 7,031,150 B2 * | 4/2006 | Chen et al. | 361/685 |

FOREIGN PATENT DOCUMENTS

CN  00231882.2  1/2001

* cited by examiner

*Primary Examiner*—Angel R. Estrada
(74) *Attorney, Agent, or Firm*—Wei Te Chung

(57) ABSTRACT

A mounting apparatus for a data storage device (10) includes a bracket (20, 50) for accommodating the data storage device and a latch member (30, 50). The latch member includes a pair of bent portions (34, 63) configured for attaching to the data storage device, and an operating portion (32, 62) connecting with the bent portions. The bent portions engage with the bracket for positioning the data storage device in the bracket. When the operating portion is pulled, the bent portions are caused to deform towards each other and disengage from the bracket for detaching the data storage device from the bracket.

20 Claims, 6 Drawing Sheets

MOUNTING APPARATUS FOR DATA STORAGE DEVICE

FIELD OF THE INVENTION

The present invention relates to mounting apparatuses, and more particularly to a mounting apparatus for securing a data storage device, such as a hard disk drive, a floppy disk drive, or a Compact Disk Read-Only Memory (CD-ROM) drive, etc.

DESCRIPTION OF RELATED ART

Usually, a data storage device is simply screwed to a computer enclosure. This conventional mounting means wastes time, and adds to the complexity and difficulty of assembling the data storage device to the computer enclosure and later disassembling therefrom.

Another kind of mounting apparatus includes a bracket, and a blocking member secured outside of the bracket. The bracket defines a plurality of pairs of grooves therein. The blocking member has a plurality of resilient latch portions corresponding to the grooves of the bracket. In assembly, a projection disposed on one data storage device slides into one groove of the bracket, and then urges one latch portion of the blocking member to deform. After the projection of the data storage device passes across the latch portion, the latch portion rebounds to block the projection and the data storage device is thereby secured into the bracket. In detaching the data storage device, the latch portion of the blocking member is pushed to disengage from the projection of the data storage device. The data storage device can be then taken away from the bracket. In this mounting means, the data storage device can be conveniently installed into the bracket, but requires both hands to detach from the bracket.

What is needed, therefore, is a mounting apparatus conveniently securing a data storage device to a bracket of a computer enclosure and allowing removal of the data storage device from the bracket by a user only using one hand.

SUMMARY OF INVENTION

A mounting apparatus for a data storage device includes a bracket for accommodating the data storage device and a latch member. The latch member includes a pair of bent portions configured for attaching to the data storage device, and an operating portion connecting with the bent portions. The bent portions engage with the bracket for positioning the data storage device in the bracket. When the operating portion is pulled, the bent portions are caused to deform towards each other and disengage from the bracket for detaching the data storage device from the bracket.

Other advantages and novel features will be drawn from the following detailed description of preferred embodiments with attached drawings, in which:

DETAILED DESCRIPTION

Figure 1:
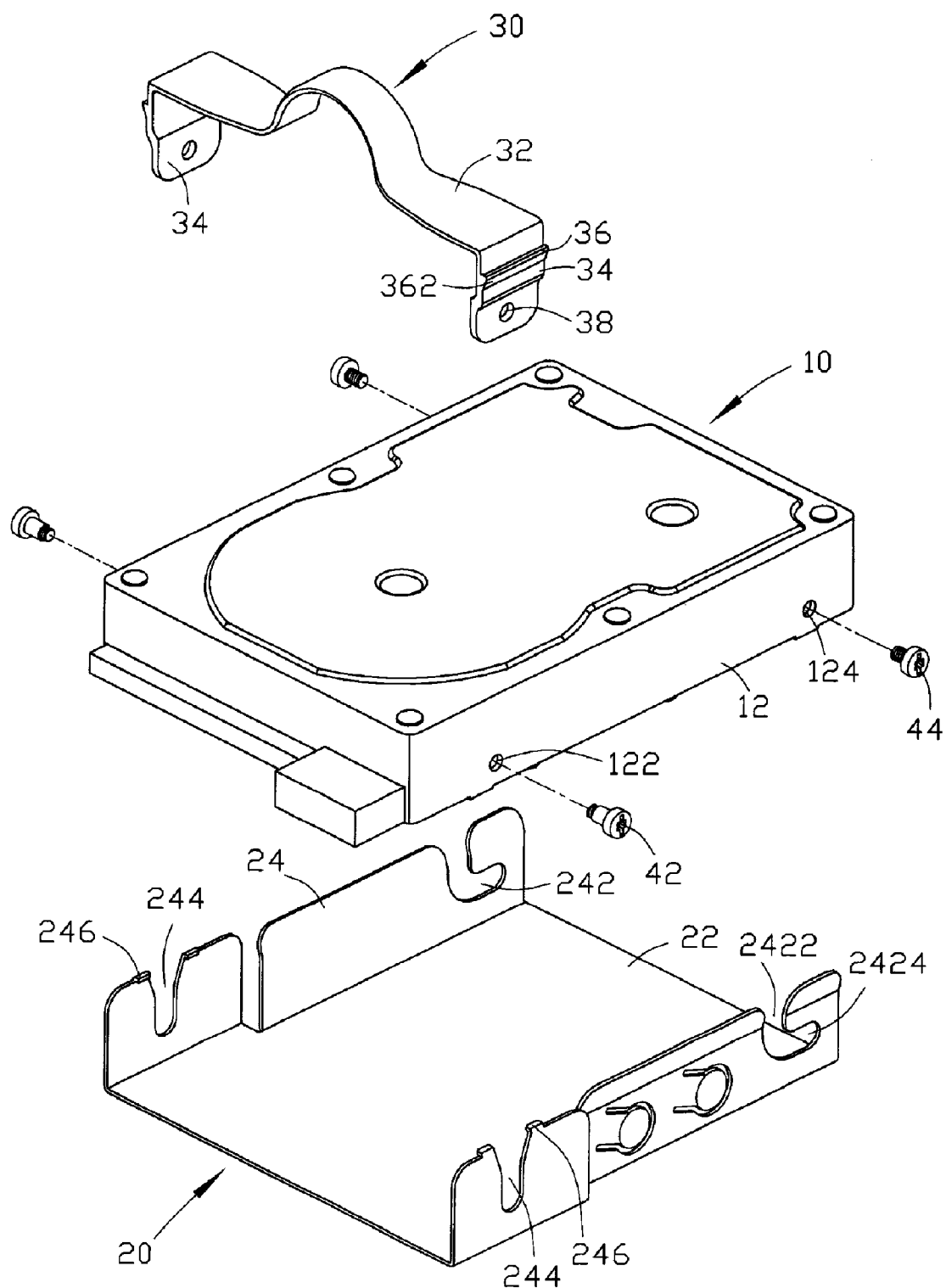
FIG. 1 is an exploded, isometric view of a mounting apparatus of a preferred embodiment, together with a data storage device, the mounting apparatus including a bracket, and a latch member.

Referring to FIG. 1, a mounting apparatus of an electronic device like a computer is used to secure a data storage device 10 which is as a part device of the computer. The data storage device 10 may, for example, be a hard disk drive, a floppy disk drive, a Compact Disk Read-Only Memory (CD-ROM) drive, etc. The data storage device 10 has a pair of sidewalls 12. Two pairs of mounting holes 122,124 are defined in the sidewalls 12, for receiving mounting members 42, 44 therein. The mounting apparatus includes a bracket 20 for accommodating the data storage device 10, and a latch member 30 attached to the data storage device 10 for locating the data storage device 10 in the bracket 20.

The bracket 20 includes a bottom plate 22, and a pair of side plates 24. The side plates 24 are perpendicularly bent from opposite edges of the bottom plate 22. A first guiding opening 242 and a second guiding opening 244 are defined in first and second end portions of each side plate 24 respectively, for holding the mounting members 42, 44 of the data storage device 10 therein. The first guiding opening 242 is generally L-shaped, and includes an access 2422, which is defined along a vertical direction generally perpendicular to the bottom plate 22, and a positioning slot 2424, which is defined along a horizontal direction generally parallel to the bottom plate 22 and has a blocking end. The second guiding opening 244 is generally defined along the vertical direction. A positioning mechanism is provided on each side plate 24. In this embodiment, the positioning mechanism includes two tabs 246 inward formed on both sides of the second guiding opening 244 on a top edge of the side plate 24. A distance between inner surfaces of the second end portions of the side plates 24 is greater than that between the first end portions thereof, for receiving the latch member 30 between the second end portions of the side plates 24.

The latch member 30 includes an operating portion 32, and a pair of bent portions 34 generally perpendicular to the operating portion 32. The operating portion 32 has a vaulted section in a middle thereof, for being conveniently operated. Each bent portion 34 includes an upper portion and a lower portion, and a distance between inner surfaces of the upper portions is greater than that between the lower portions thereof. A hook protrusion 36 is formed on an outer surface of the upper portion of each bent portion 34. Each hook protrusion 36 has a transition surface 362, thereby the latch member 30 can be inserted into the bracket 20. In this embodiment, the transition surfaces 362 may, for example, be slanted surfaces, or arc-shaped surfaces, etc. A through hole 38 is defined in the lower portion of each bent portion 34, for the mounting members 42 inserting therethrough.

Figure 2:
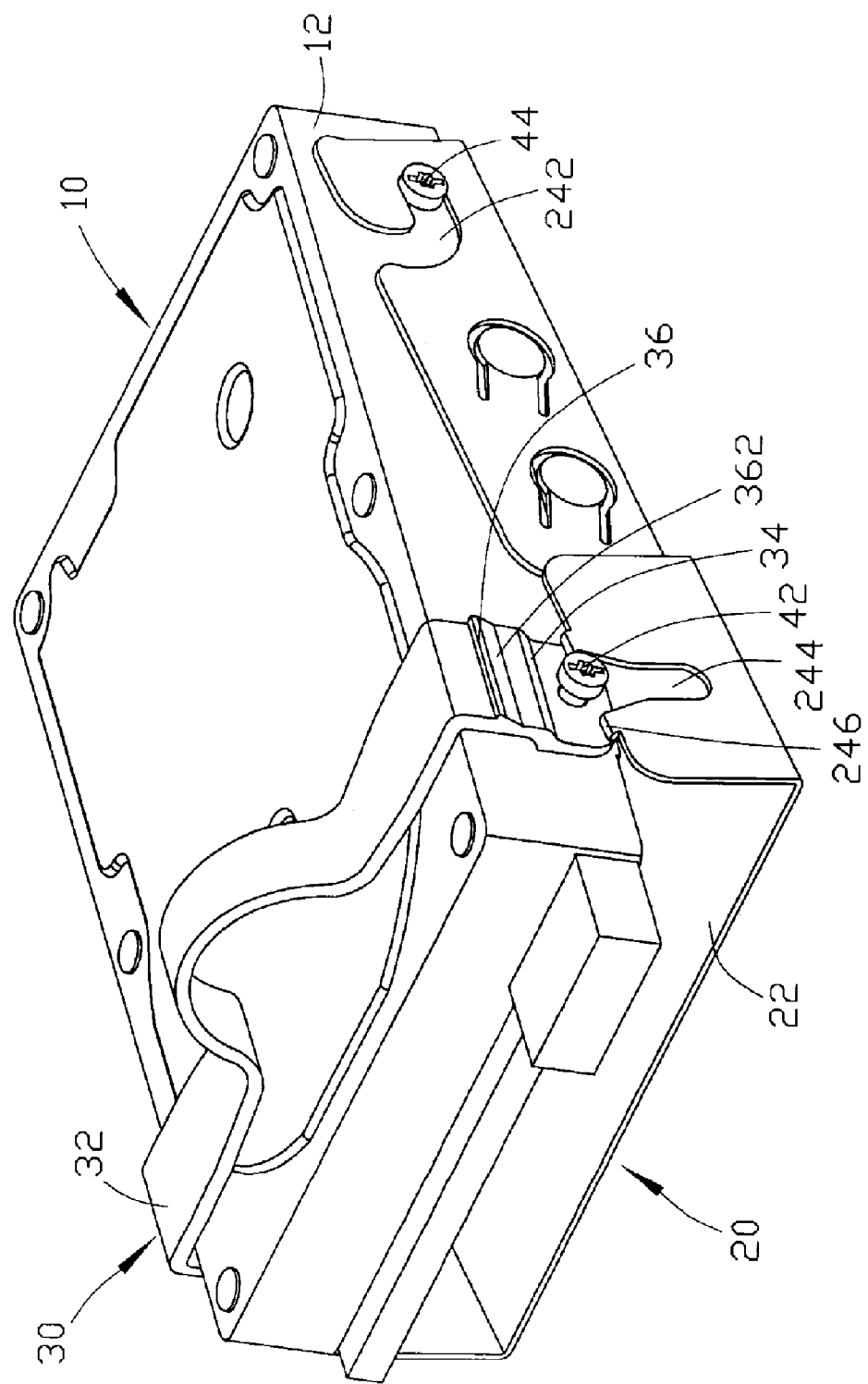
FIG. 2 is a preassembled, isometric view of FIG. 1.
Figure 3:
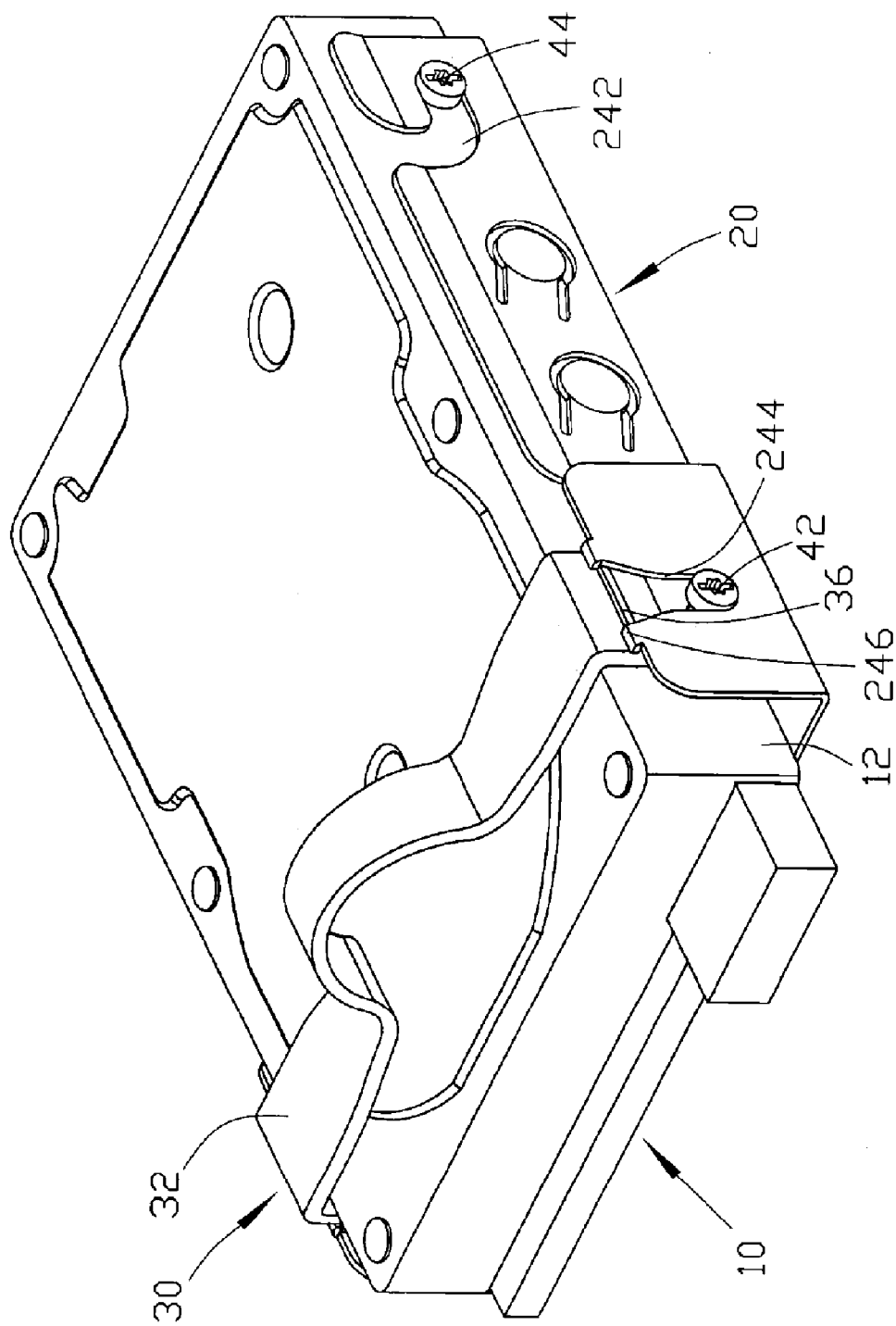
FIG. 3 is an assembled view of FIG. 1.

Referring also to FIGS. 2 and 3, before assembly of the data storage device 10, the latch member 30 is placed on the data storage device 10, with the operating portion 32 abutting against a top surface of the data storage device 10. The through hole 38 of each bent portion 34 aligns with one mounting hole 122 of each sidewall 12 of the data storage device 10. The mounting members 42 are screwed into the corresponding holes 122 of the data storage device 10 through the through holes 38 of the latch member 30, thereby securing the latch member 30 on the data storage device 10. A space is formed between the upper portion of each bent portion 34 of the latch member 30 and the corresponding sidewall 12 of the data storage device 10, due to the distance between inner surfaces of the upper portions of the bent portions 34 being greater than that between the lower portions thereof. The bent portions 34 can thus resiliently deform. The mounting members 44 are then secured into the corresponding mounting holes 124 of the data storage device 10, respectively.

In assembling the data storage device 10 to the bracket 20, the mounting members 44 of the data storage device 10 are inserted into the first guiding openings 242 of the side plates 24 of the bracket 20 respectively, via the access 2422, and slide into the positioning slots 2424 thereof until blocked by the blocking end thereof. Then, the data storage device 10 together with the latch member 30 is rotated down about an axis provided by the mounting members 44 retained in the positioning slots 2424. The mounting members 42 of the data storage device 10 slide into the second guiding opening 244 respectively. While the tabs 246 of the side plates 24 ride over the corresponding transition surfaces 362 of the hook portions 36 of the bent portions 34 of the latch member 30 respectively, the upper portions of the bent portions 34 gradually resiliently deform towards the corresponding sidewalls 12 of the data storage device 10. When the tabs 246 pass across the hook portions 36 of the bent portions 34 respectively, the upper portion of the bent portions 34 rebound, thereby the tabs 246 engaging with the hook portions 36 of the latch member 30. The data storage device 10 is blocked from rotating up, and thus secured into the bracket 20.

In removal of the data storage device 10, the operating portion 32 of the latch member 30 is pulled up to urge the upper portions of the bent portion 34 to deform towards each other again, until the tabs 246 of the side plates 24 disengage from the hook portions 36 respectively. The data storage device 10 together with the latch member 30 can thus be rotated up. When the mounting members 44 of the data storage device 10 slide out of the first guiding openings 242 of the side plates 24 respectively, the data storage device 10 together with the latch member 30 can thus be taken away from the bracket 20.

Figure 4:
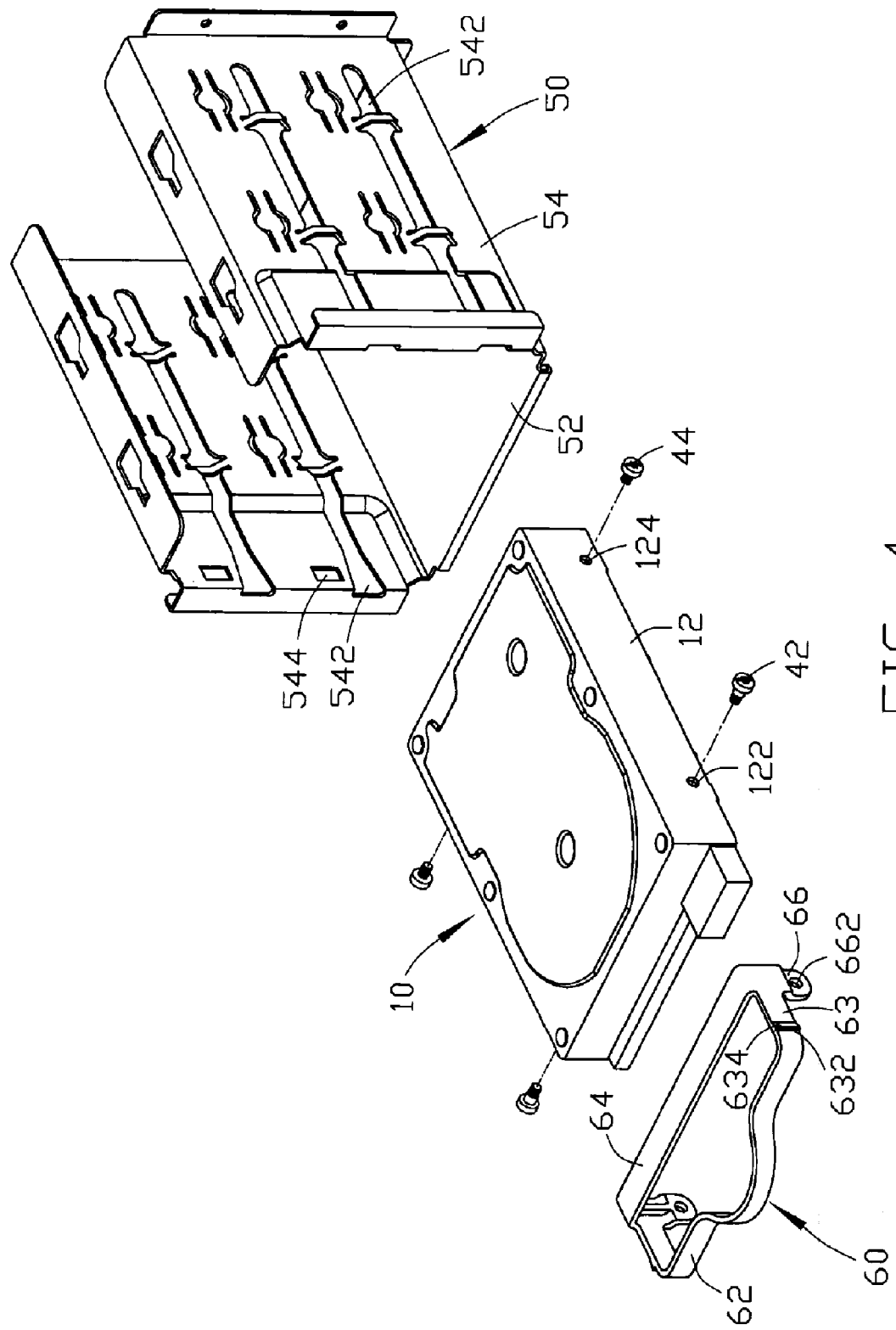
FIG. 4 is an exploded, isometric view of a mounting apparatus of an alternative embodiment, together with a data storage device, the mounting apparatus including a bracket, and a latch member.

Referring to FIG. 4, the mounting apparatus of an alternative embodiment includes a bracket 50 for receiving the data storage device 10, and a latch member 60 for locking the data storage device 10 into the bracket 50.

The bracket 50 includes a bottom plate 52 and a pair of side plates 54. Each side plate 54 horizontally defines two guiding openings 542 therein. Each guiding opening 542 has an access for the mounting members 42, 44 of the data storage device 10 sliding thereinto, and a blocking end for blocking the mounting member 44. A positioning mechanism is provided in the side plates 54 above each guiding opening 542, adjacent to the access thereof. In this embodiment, the positioning mechanism may be a generally rectangular locking opening 544.

The latch member 60 includes an operating portion 62, and a pair of bent portions 63 generally perpendicular to the operating portion 62 respectively. The operating portion 62 has a vaulted section in a middle thereof. A hook protrusion 632 is formed on an outer surface of each bent portion 63. Each protrusion 632 has a transition surface 634, thereby the latch member 60 can be inserted into the bracket 50. In this embodiment, the transition surface 634 may be a slanted surface or an arc-shaped surface. A connecting portion 64 connects free ends of the opposite bent portions 63, and a securing portion 66 extends down from a bottom edge of each bent portion 63. A through hole 662 is defined in each securing portion 66, for the mounting member 42 of the data storage device 10 inserting therethrough. A distance between inner surfaces of the bent portions 63 is greater than that between the securing portions 66 thereof.

Figure 5:
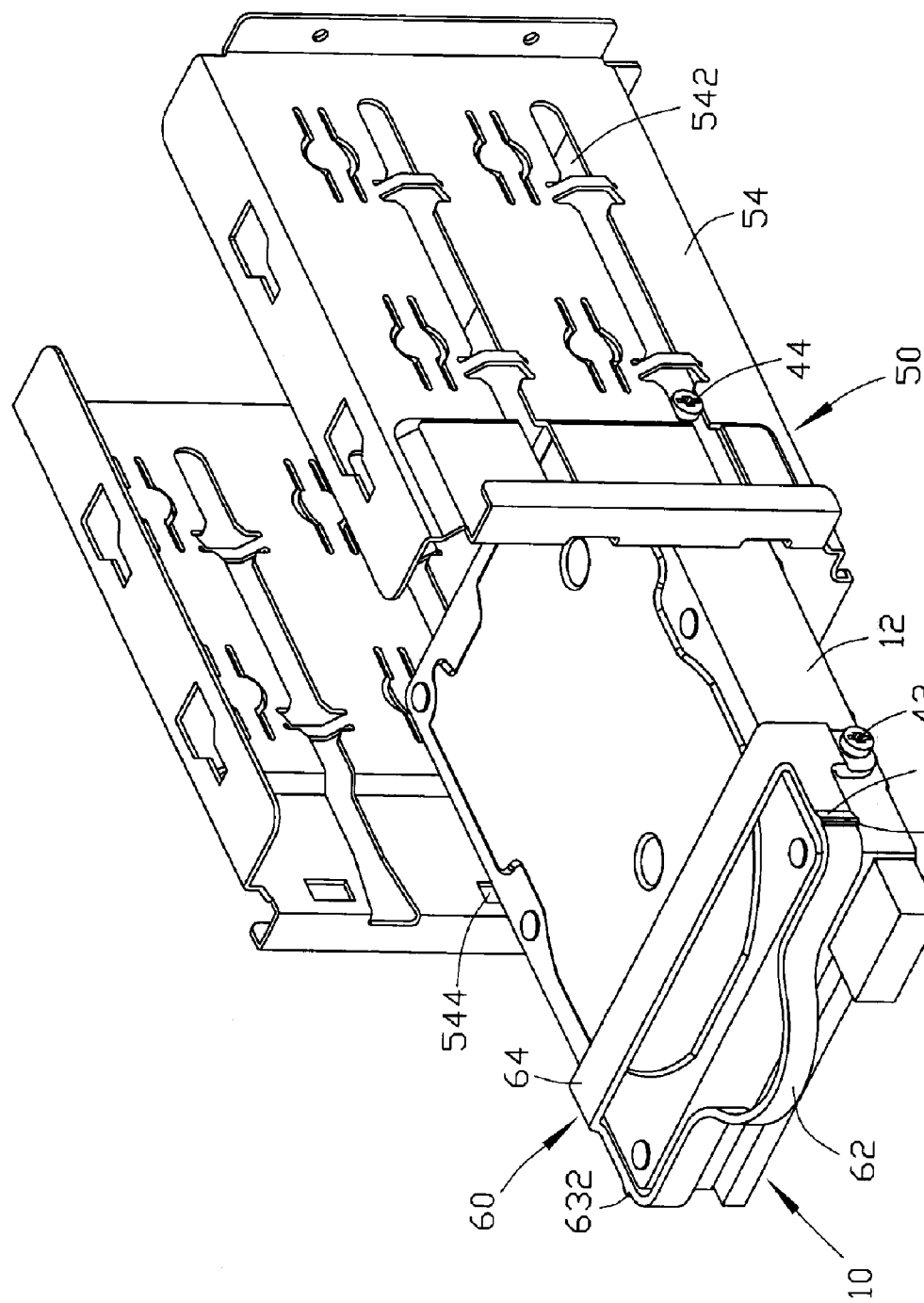
FIG. 5 is a preassembled, isometric view of FIG. 4.
Figure 6:
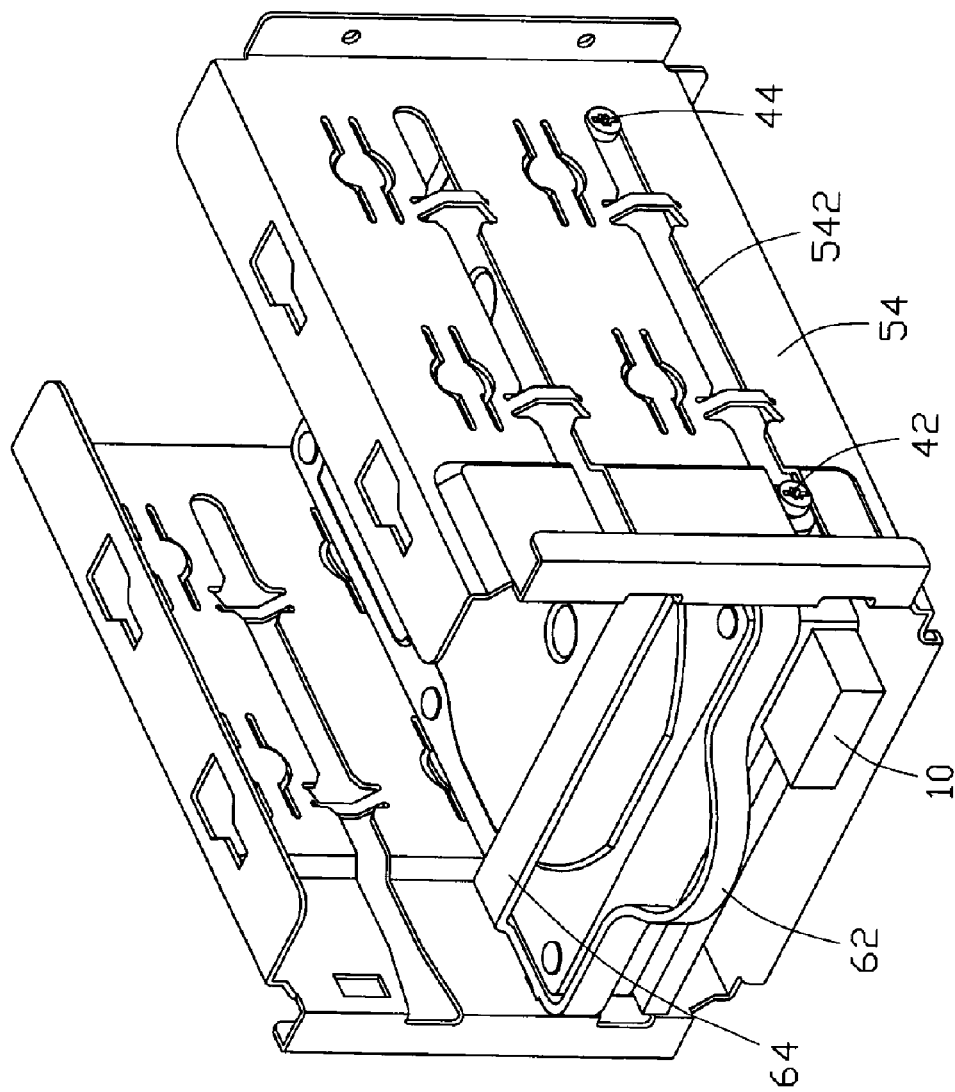
FIG. 6 is an assembled view of FIG. 4.

Referring also to FIGS. 5 and 6, before assembly of the data storage device 10, the latching member 60 is mounted to the data storage device 10, with the mounting members 42 screwed into the mounting holes 122 via the through holes 662 of the securing portions 66 of the latch member 60 respectively. The connecting portion 64 abuts against the top surface of the data storage device 10, and the operating portion 62 is adjacent to a rear end of the data storage device 10. A space is formed between each bent portion 63 and the corresponding sidewall 12 of the data storage device 10, due to the distance between the inner surfaces of the bent portions 63 being greater than that between the securing portions 66. The mounting members 44 are then secured into the corresponding mounting holes 124 of the data storage device 10, respectively.

In assembly of the data storage device 10, the data storage device 10 together with the latch member 60 is horizontally pushed into the bracket 50, and the mounting members 42, 44 of the data storage device 10 slide into the corresponding guiding openings 542 of the bracket 50, respectively. During the side plates 54 of the bracket 50 ride over the transition surfaces 634 of the hook protrusion 632 of the latch member 60 respectively, the bent portions 63 gradually resiliently deform. The latch member 60 inserts into the bracket 50. When the mounting members 44 are blocked by the blocking ends of the guiding openings 542 respectively, the hook protrusions 632 of the latch member 60 reach the corresponding locking openings 544 of the bracket 50. The bent portions 63 rebound, and the hook protrusions 632 therefore engage into the corresponding locking openings 544. The data storage device 10 together with the latch member 60 is blocked from sliding out, and thus secured into the bracket 50.

In removal of the data storage device 10, the operating portion 62 of the latch member 60 is horizontally pulled out. The bent portions 63 are resiliently deformed again with the pulling of the operating portion 62, and the hook protrusions 632 thereby disengage from the corresponding locking openings 544 respectively. The data storage device 10 and the latch member 60 can thus be pulled out from the bracket 50.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for a data storage device, comprising:
   a bracket for accommodating the data storage device; and
   a latch member comprising a pair of bent portions configured for attaching to the data storage device and movable to together therewith relative to the bracket, and an operating portion connecting with the bent portions, the bent portions engaging with the bracket for positioning the data storage device in the bracket, wherein when the operating portion is pulled, the bent portions are caused to deform towards each other and disengage from the bracket for detaching the data storage device from the bracket.

2. The mounting apparatus as described in claim 1, wherein a hook protrusion is formed on one of the bent portions of the latch member, and a positioning mechanism is provided on the bracket for engaging with the hook protrusion.

3. The mounting apparatus as described in claim 2, wherein the positioning mechanism comprises at least one tab protruding from the bracket.

4. The mounting apparatus as described in claim 2, wherein the positioning mechanism comprises a locking opening defined in the bracket.

5. The mounting apparatus as described in claim 2, wherein the hook protrusion has a transition surface, for the latch member engaging into the bracket.

6. The mounting apparatus as described in claim 5, wherein the transition surface is a slanted surface or an arc-shaped surface.

7. The mounting apparatus as described in claim 1, wherein the pair of bent portions directly extends from opposite ends of the operating portion respectively.

8. A mounting apparatus for a data storage device, comprising:
   a bracket for accommodating the data storage device; and
   a latch member comprising a pair of bent portions configured for attaching to the data storage device, and an operating portion connected between the bent portions, one of the bent portions engaging with the bracket for securing the data storage device in the bracket, a space formed between the one of the bent portions and the data storage device, and configured for resilient deformation of the one of the bent portions to disengage from the bracket when the operating portion is pulled outward;
   wherein the bracket comprises a bottom plate and a pair of side plates perpendicular to the bottom plate, each of the side plates defines a generally L-shaped first guiding opening in a first end portion, and comprises an access for a mounting member disposed on the data storage device sliding into the first guiding opening, and a positioning slot for blocking the mounting member.

9. The mounting apparatus as described in claim 8, wherein a hook protrusion is formed on the one of the bent portions of the latch member, and a positioning mechanism is provided on the bracket for engaging with the hook protrusion.

10. The mounting apparatus as described in claim 9, wherein the positioning mechanism comprises at least one tab protruding from the bracket.

11. The mounting apparatus as described in claim 9, wherein the positioning mechanism comprises a locking opening defined in the bracket.

12. The mounting apparatus as described in claim 8, wherein each of the side plates of the bracket defines a second guiding opening generally perpendicular to the bottom plate in a second end portion opposite to the first end portion, and the positioning mechanism is formed adjacent to the second guiding opening.

13. The mounting apparatus as described in claim 12, wherein a distance between the second end portions of the side plates of the bracket is greater than that between the first end portions thereof, and the bent portions of the latch member are received between the second portions thereof.

14. The mounting apparatus as described in claim 8, wherein the bent portions are respectively sandwiched between the data storage device and the bracket.

15. The mounting apparatus as described in claim 8, wherein the bent portions of the latch member are secured to the data storage device before the data storage device engaging to the bracket.

16. An electronic device comprising:
   a part device of said electronic device capable of extending function of said electronic device;
   a bracket of said electronic device defining a space therein for accommodating said part device; and
   a latch member attachable to said part device and movable together with said part device relative to said bracket, said latch member capable of interacting with said bracket to retain said part device in said bracket when said part device moves to reside in said space of said bracket, and an operating portion defined on said latch member and user-operable to urge movement of said part device and disable interaction between said latch member and said bracket simultaneously.

17. The electronic device as described in claim 16, wherein a pair of bent portions extends from said operating portion to form said latch member together with said operating portion, and is configured to be attachable against said part device.

18. The electronic device as described in claim 16, wherein said interaction between said latch member and said bracket to retain said part device in said bracket is capable of being disabled by means of resilient deformation of said latch member.

19. The electronic device as described in claim 16, wherein said operating portion of said latch member extends along a side of said part device different from another side of said part device where said latch member is attachable thereto.

20. The electronic device as described in claim 16, wherein said combined latch member together with said part device is pivotable or straightly slidable relative to said bracket.

* * * * *